(12) United States Patent
Johnson

(10) Patent No.: US 9,441,488 B1
(45) Date of Patent: Sep. 13, 2016

(54) FILM COOLING HOLES FOR GAS TURBINE AIRFOILS

(71) Applicant: The United States of America, as represented by the Secretary of the Air Force, Washington, DC (US)

(72) Inventor: Jamie Jay Johnson, Rancho Palos Verdes, CA (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 482 days.

(21) Appl. No.: 14/074,648

(22) Filed: Nov. 7, 2013

(51) Int. Cl.
*F01D 5/18* (2006.01)

(52) U.S. Cl.
CPC ............. *F01D 5/186* (2013.01); *F01D 5/187* (2013.01); *F05D 2240/123* (2013.01); *F05D 2240/124* (2013.01); *F05D 2240/306* (2013.01); *F05D 2260/202* (2013.01)

(58) Field of Classification Search
CPC ........ F01D 5/186; F01D 5/187; F01D 25/08; F05D 2260/202; F05D 2240/123; F05D 2240/124; F05D 2240/305; F05D 2240/306
See application file for complete search history.

(56) References Cited

U.S. PATENT DOCUMENTS

| | | | |
|---|---|---|---|
| 5,419,681 A * | 5/1995 | Lee .................... | F01D 5/186 415/115 |
| 6,234,755 B1 * | 5/2001 | Bunker ................ | F01D 5/186 416/241 R |
| 6,897,401 B2 | 5/2005 | Kildea | |
| 7,186,085 B2 | 3/2007 | Lee | |
| 7,553,534 B2 * | 6/2009 | Bunker ................ | F01D 5/186 415/115 |
| 7,997,868 B1 | 8/2011 | Liang | |
| 8,105,030 B2 * | 1/2012 | Abdel-Messeh ........ | F01D 5/187 415/115 |
| 8,245,519 B1 | 8/2012 | Liang | |
| 2009/0246011 A1 * | 10/2009 | Itzel .................... | F01D 5/186 415/208.1 |
| 2010/0183446 A1 | 7/2010 | Ammann et al. | |
| 2011/0097188 A1 | 4/2011 | Bunker | |
| 2011/0186550 A1 | 8/2011 | Gannelli et al. | |
| 2011/0311369 A1 | 12/2011 | Ramachandran et al. | |
| 2013/0115103 A1 | 5/2013 | Dutta et al. | |
| 2013/0268244 A1 | 10/2013 | Clark et al. | |

FOREIGN PATENT DOCUMENTS

| | | |
|---|---|---|
| EP | 2359972 A2 | 8/2011 |
| EP | 2592229 A2 | 5/2013 |

OTHER PUBLICATIONS

Bunker, R S., "A Review of Shaped Hole Turbine Film-Cooling Technology," Journal of Heat Transfer, vol. 27, pp. 441-453 (Apr. 2005).

(Continued)

*Primary Examiner* — Ninh H Nguyen
(74) *Attorney, Agent, or Firm* — AFMCLO/JAZ; Timothy Barlow

(57) ABSTRACT

A new configuration for film cooling holes for gas turbine airfoils, such as rotor blades and stator vanes, provides both improved performance and is easier to manufacture than prior art holes. The new configuration machines a shallow trench across a row of prior art shaped cooling holes. Unlike prior art holes cut through a trench, where shaped holes are difficult to machine through a trench, the shallow trench can be easily machined across a row of shaped cooling holes.

8 Claims, 4 Drawing Sheets

(56) References Cited

OTHER PUBLICATIONS

Colban, W. F., et al, "A Film-Cooling Correlation for Shaped Holes on a Flat-Plate Surface," Journal of Turbomachinery, vol. 133, 011002 (Sep. 7, 2010).

Colban, W. F., "A Detailed Study of Fan-Shaped Film-Cooling for a Nozzle Guide Vane for an Industrial Gas Turbine," Ph.D. Dissertation in Mechanical Engineering, Virginia Polytechnic Institute and State University (Nov. 28, 2005).

Dhungel, A., "Film Cooling from a Row of Holes Supplemented with Anti Vortex Holes," M.S. Thesis for Mechanical Engineering, Louisana State University and Mechanical College (Aug. 2007).

Gao, Z., et al., "Film-Cooling on a Gas Turbine Blade Pressure Side or Suction Side with Compound Angle Shaped Holes," Journal of Turbomachinery, vol. 131, 011019-1 (Jan. 2009).

Hyams, D. G., et al, A Detailed Analysis of Film Cooling Physics: Part III-Streamwise Injection with Shaped Holes, Transactions of the ASME, vol. 122 (Jan. 2000).

Johnson, J. J., et al, "Three-Dimensional Film-Cooled Vane CFD Simulations and Preliminary Comparison to Experiments," 49th AIAA Aerospace Sciences Meeting, Orlando, FL, (Jan. 4-7, 2011).

Johnson, J. J., "Designed Optimization Methods for Improving HPT Vane Pressure Side Cooling Properties Using Genetic Algorithms and Efficient CFD," 50th AIAA Aerospace Sciences Meeting, Nashville TN, AIAA 2012-0326 (Jan. 9-12, 2012).

Lu, Y., "Effect of Hole Configurations on Film Cooling from Cylindrical Inclined Holes for the Application to Gas Turbine Blades," Ph.D. Dissertation in Engineering Science, Louisiana State University and Agricultural and Mechanical College (Dec. 2007).

* cited by examiner

FILM COOLING HOLES FOR GAS TURBINE AIRFOILS

RIGHTS OF THE GOVERNMENT

The invention described herein may be manufactured and used by or for the Government of the United States for all governmental purposes without payment of any royalty.

BACKGROUND OF THE INVENTION

The present invention relates generally to film cooling holes for cooling airfoils in gas turbines, such as rotor blades and stator vanes, and more particularly to a new mini-trench shaped (MTS) cooling hole.

Airfoil surfaces inside gas turbines, such as jet engines, have to survive very high temperature environments. A primary method for protecting those surfaces is by including cavities inside the airfoils so that cooler air from other gas turbine sections, typically compressor air, can be supplied to those cavities and then discharged through small openings, or film cooling holes, in the airfoil surface to form a protective boundary layer, or film, of cooler air.

Modern production gas turbine engines typically use two types of film cooling holes: cylindrical, constant-diameter holes; and, laterally-expanding, forward-diffused, laidback fan shaped holes, part of a group of so-called shaped holes.

Cylindrical holes typically work best for leading edges of airfoils. Shaped holes typically work best for the remaining surfaces.

U.S. Patent Application Publication 2013/0115103 by Dutta et al., in its FIG. 1, shows an example row of laidback fan shaped holes 12.

The Dutta et al. patent application also shows a modification to laidback fan shaped holes 12 by adding a small trench 14 inside each shaped hole.

U.S. Patent Application Publication 2011/0097188 by Bunker shows a series of shaped holes inside a shallow trench.

Such trenched shaped holes appear to improve cooling by providing space beneath a main flow for providing additional cooling air as needed.

Trenches especially help with lateral cooling because they increased cooling effectiveness between individual cooling holes as that cooling air is spread over the length of a row of shaped holes without increasing demand for mass flow of air. Many proposed trench configurations have been tested in recent years and the best performing configurations so far involve shaped holes inside a trench.

A problem with such shaped holes inside a trench is that they are difficult to manufacture. The forward edge of the trench, for example, blocks an electrical discharge machining (EDM) drill from making the complicated shapes of a shaped hole inside.

There is, therefore, a need for an improved film cooling hole configuration that provides the same, or better, performance as shaped holes inside a trench, and is also easier to manufacture.

SUMMARY OF THE INVENTION

The present invention solves the problems of the prior art with a new mini-trench shaped (MTS) hole that, instead of shaped holes inside a trench, as in the prior art, places a shallow trench along a row of shaped holes.

The MTS hole configuration not only works as well, or better, than prior art configurations, it is also easier to manufacture as it uses a smaller trench that is carved after, instead of before, the shaped holes, making for a simple, two-step manufacturing process from the outer surface.

BRIEF DESCRIPTION OF THE DRAWINGS

The teachings of the present invention will be better understood from the following drawings illustrating various aspects and example embodiments of the invention and its teachings.

DETAILED DESCRIPTION OF THE INVENTION

The present invention is described in Johnson, J. J., King, P. I., Clark, J. P., Lethander, A. T., and Posada, N. A., "Infrared Assessment of an Optimized Vane Pressure Side Film Cooling Array," *Proceedings of the International Mechanical Engineering Conference and Exposition* 2012, Nov. 9-15, 2012; and, in *Genetic Algorithm Optimization of a Film Cooling Array on a Modern Turbine Inlet*, the inventor's Ph.D. dissertation at the Air Force Institute of Technology, Wright-Patterson Air Force Base, Ohio.

Both papers are fully incorporated by reference into this Detailed Description.

Figure 1:
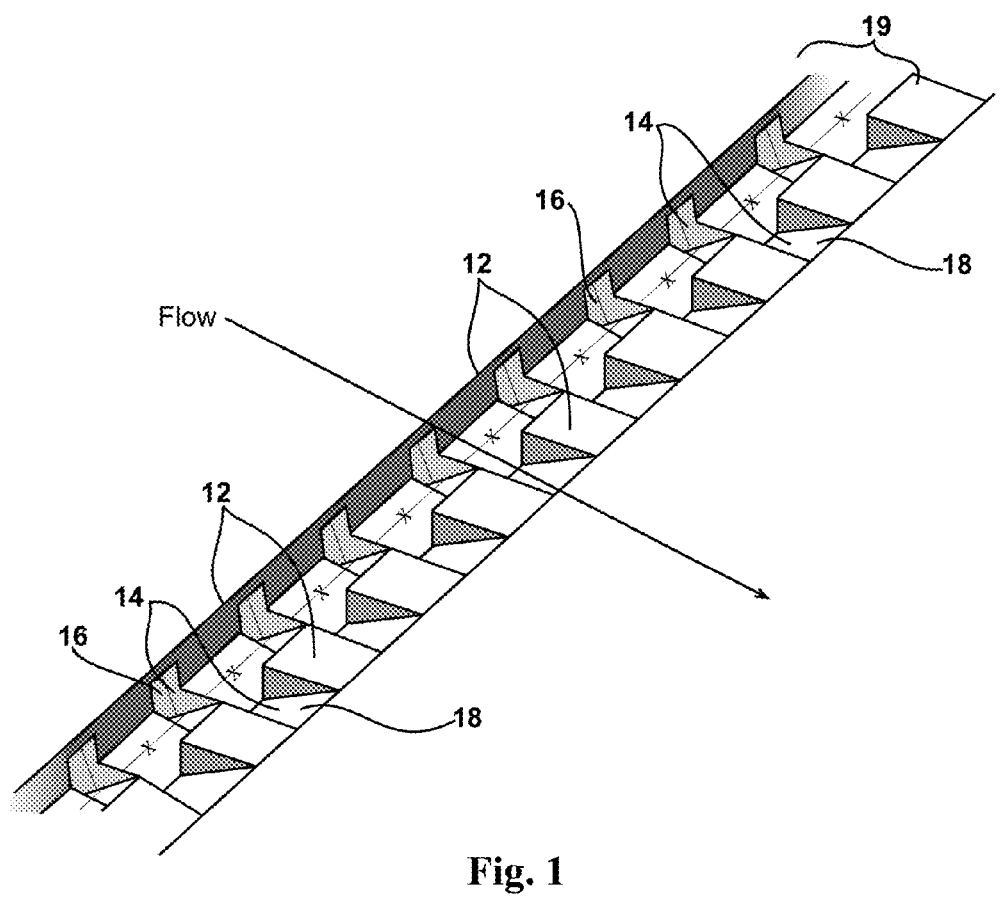
FIG. 1 and FIG. 4 are schematic perspective views of example embodiments of a trench cut across a row of shaped film cooling holes to form a mini-trench shaped hole according to the teachings of the present invention.
Figure 4:
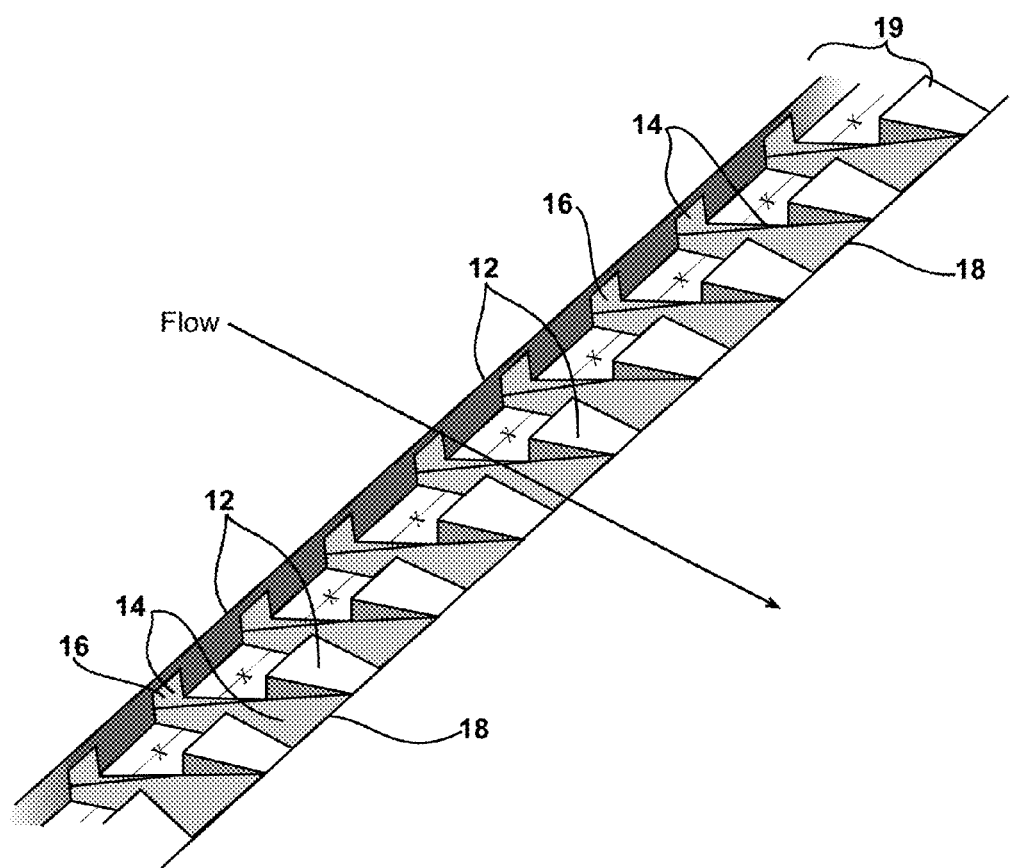

Referring to the drawings, FIG. 1 and FIG. 4 show a schematic perspective views of example embodiments of a trench 12 machined, or cut, across a row of prior art shaped film cooling holes 14 to form a mini-trench shaped hole 19 according to the teachings of the present invention. Each shaped hole 14 includes an opening 16 from an inside surface of an airfoil wall, where it communicates with a supply of air inside a cavity formed inside the airfoil. Air from openings 16 reach the outside surface of the airfoil through a diffusion region 18.

Figure 2:
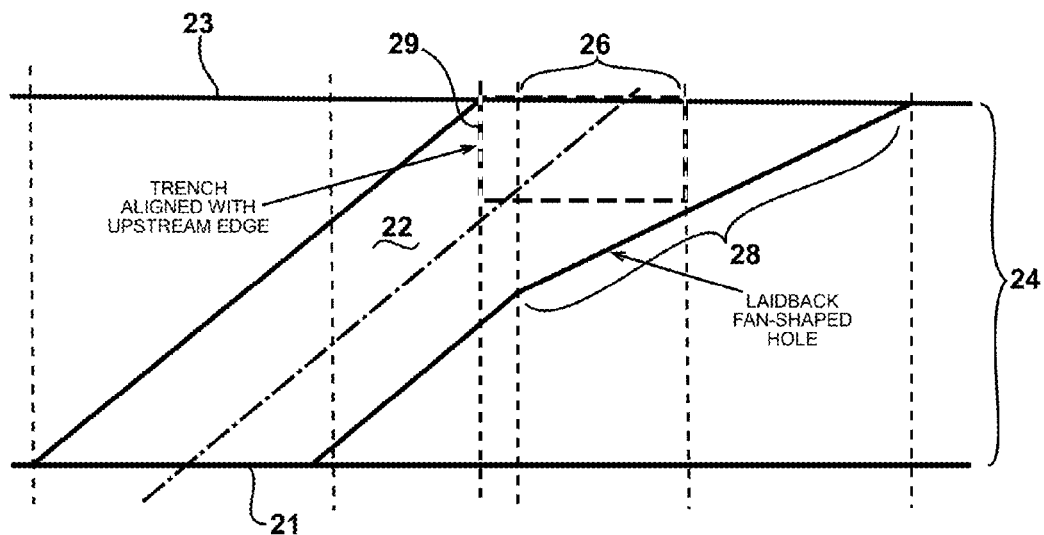
FIG. 2 is a schematic cross-sectional view of a prior art shaped hole showing an example embodiment of a trench machined across a row of prior art shaped holes to form a mini-trench shaped hole according to the teachings of the present invention.

FIG. 2 is a schematic cross-sectional view of a prior art shaped hole 22 extending from an inside surface 21 of a wall 24 of an airfoil to an outside surface 23. A laidback fan-shaped diffusion area 28 completes the shape of example shaped hole 22. A trench 26 is machined, or cut, though shaped hole 22, in this example embodiment, aligned with an upstream edge 29 of shaped hole 22, to complete a mini-trench shaped hole according to the teachings of the present invention.

Figure 3:
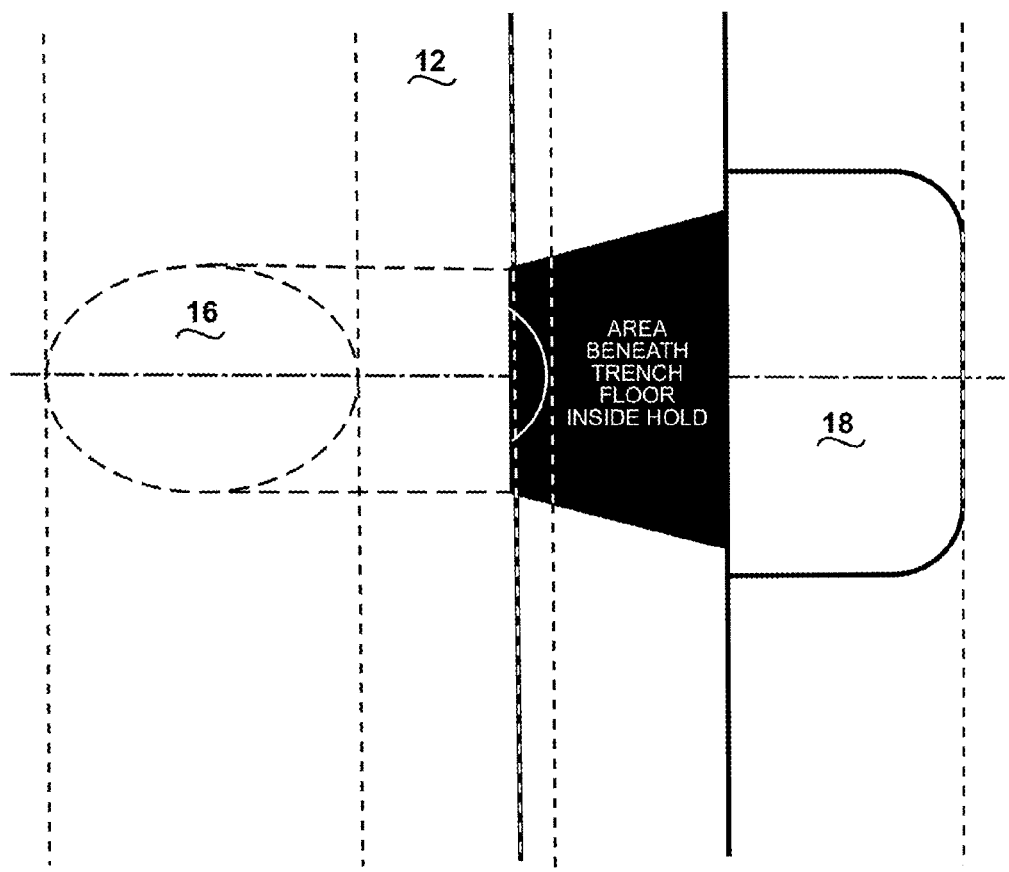
FIG. 3 is a schematic top-down view of the example mini-trench shaped hole of FIG. 2.

FIG. 3 is a schematic top-down view of the example mini-trench shaped hole of FIG. 2.

As described in the referenced conference paper and dissertation, the new mini-trench shaped cooling holes work better than prior art designs. The small trench may disturb flow over an airfoil less than larger, typical trenched hole configurations, while retaining the inherent laterally-diffusive cooling benefit of a trench.

The MTS hole configuration not only works as well, or better, than prior art configurations, it is also easier to manufacture as it uses a smaller trench that is carved, or machined, after, instead of before, the shaped holes, making for a simple, two-step manufacturing process from the outer surface.

The first step is to drill holes and then mill out a diffused part to form a shaped hole. The second step is to mill out a transverse trench in with the upstream edge of the shaped holes, completing the MTS hole.

This process also allows for sharp edges to be readily "burned off," both as part of the manufacturing process and inherently during operation of a gas turbine, providing smoother shapes that still permit mixing and may prevent local losses.

The teachings of the present invention allow for a multitude of other possible configuration and shapes. As described in the referenced dissertation, for example, side by side shaped holes do not have to be in a straight row, but can be placed at intersecting compound angles and then trenched along those angles to connect the shaped holes.

Such unconventional shapes can allow better mixing, better near wall lateral coverage and other advantages.

The MTS hole configuration provides a better distribution of cooling flow over any hot surface, in addition to gas turbine airfoils. Those with skill in the art of the invention will readily see, therefore, application of its teachings to other areas where gas film layers are needed or may be useful. The use of such terms as "air" and "shaped holes" are understood by those with skill in the art to be merely standard terminology in this one art area, for ease of understanding, and that, for example, "air" includes any gas and "shaped holes" includes shaped holes other than laid-back fan shaped holes. Those with skill in the art will similarly understand that as used in this description, the mini-trench shaped hole can be viewed as a single hole formed as a trench that includes multiple separately shaped openings through an airfoil surface, or as mini-trench shaped cooling holes, both describing the same structure.

Various other modifications to the invention as described may be made, as might occur to one with skill in the art of the invention, within the scope of its teaching and the claims. Therefore, all contemplated example embodiments have not been shown in complete detail. Other embodiments may be developed without departing from the spirit of the invention or from the scope of the claims.

I claim:

1. A gas turbine airfoil having a wall, the wall having an inside surface and an outside surface, comprising:
    (a) a plurality of side by side shaped cooling holes, arranged in a lateral row, formed through the wall and extending from the inside surface to the outside surface, the cooling holes being angled through the wall of the airfoil;
    (b) a trench machined into the outside surface of the wall and connecting the plurality of shaped cooling holes, the trench having a floor, an upstream surface and a downstream surface;
    (c) a plurality of ramped diffusion regions, wherein each ramped diffusion region extends from one of the plurality of cooling holes and up to the outside surface of the airfoil, the ramped diffusion regions being in the same plane as a bottom surface of the corresponding cooling hole as an uninterrupted extension of the shaped hole, and the plurality of ramped diffusion regions extending along the lateral direction.

2. The gas turbine airfoil according to claim 1, wherein the cooling holes extend through the intersection of the upstream surface and the floor of the trench to the outside surface of the airfoil.

3. The gas turbine airfoil according to claim 1, wherein adjacent ramped diffusion regions are separated by portions of the outside surface of the wall.

4. The gas turbine airfoil according to claim 1, wherein the ramped diffusion region begins about half way between the inside surface of the airfoil and the floor of the trench.

5. A method for making a mini-trench shaped cooling hole for a gas turbine airfoil, the gas turbine airfoil having a wall having an inside surface and an outside surface, comprising the steps of:
    (a) machining a plurality of side by side shaped film cooling holes through the wall and extending from the inside surface to the outside surface, the cooling holes being angled through the wall of the airfoil and arranged in a lateral row;
    (b) machining a trench into the outside surface of the wall and connecting the plurality of shaped cooling holes, the trench having a floor, an upstream surface and a downstream surface; and
    (c) machining a plurality of ramped diffusion regions, wherein each ramped diffusion region extends from one of the plurality of cooling holes and up to the outside surface of the airfoil, the ramped diffusion regions being in the same plane as a bottom surface of the corresponding cooling hole as an uninterrupted extension of the shaped hole, and the plurality of ramped diffusion region extending along the lateral direction.

6. The method for making a mini-trench shaped cooling hole for a gas turbine airfoil according to claim 5, wherein the cooling holes extend through the intersection of the upstream surface and the floor of the trench to the outside surface of the airfoil.

7. The method for making a mini-trench shaped cooling hole for a gas turbine airfoil according to claim 5, wherein adjacent ramped diffusion regions are separated by portions of the outside surface of the wall.

8. The method for making a mini-trench shaped cooling hole for a gas turbine airfoil according to claim 5, wherein the ramped diffusion region begins about half way between the inside surface of the airfoil and the floor of the trench.

* * * * *